United States Patent [19]
Bolger

[11] Patent Number: 5,625,485
[45] Date of Patent: Apr. 29, 1997

[54] RESONATE NOTCH FILTER ARRAY

[76] Inventor: Stephen R. Bolger, 127 W. 79th St., Apartment 11J, New York, N.Y. 10024

[21] Appl. No.: 510,472

[22] Filed: Aug. 2, 1995

[51] Int. Cl.$^6$ ................................ G02F 2/02; H02N 6/00
[52] U.S. Cl. .................... 359/326; 136/253; 136/257; 250/227.18; 250/503.1; 359/328
[58] Field of Search ........................... 136/253, 257; 250/227.18, 503.1; 359/326, 328

[56] References Cited

U.S. PATENT DOCUMENTS 5,403,405  4/1995  Fraas et al. ........................ 136/253
5,420,719  5/1995  Montgomery et al. ............. 359/566

*Primary Examiner*—Aaron Weisstuch
*Attorney, Agent, or Firm*—Samuels, Gauthier, Stevens & Reppert

[57] ABSTRACT

A parallel paired, closely coupled, first and second resonant notch filter array. The disclosed frequency doubling filters are particularly useful in the field of thermophotovoltaics for upgrading black body radiation from heated objects to a shorter wavelength such as for illuminating silicon solar cells.

3 Claims, 1 Drawing Sheet

1

RESONATE NOTCH FILTER ARRAY

FIELD OF THE INVENTION

The invention generally relates to the use of thermophotovoltaics for converting thermal radiation from heated objects directly to electricity by means of photocells. In particular, the invention relates to a thermophotovoltaic generator where paired resonant notch filter arrays selectively transmit a desired portion of an incident spectrum of electromagnetic radiation to a photocell.

BACKGROUND OF THE INVENTION

Conventionally, to limit undesirable temperature buildup in the photocells, the radiation spectrum from the heated object is filtered to illuminate the photocells only with photons of near optimal energy corresponding to the band gap of the semiconductor used to fabricate the cells. In order to effectively utilize the available radiation from the heated object, the semiconductor used in the photocells must have a band gap which energetically corresponds to that of the peak of the radiation spectrum emitted by the source. TPV generators of the prior art have typically employed costly unconventional small band gap semiconductors, such as GaSb, in photocells designed to match the radiation spectral peak of objects heated to the order of 1400 degrees Kelvin. Much higher temperatures on the order of 2200° K., are required to heat objects sufficiently to produce a spectrum suitable to illuminate conventional silicon cells in a TPV generator. Such high temperatures introduce many complications and the use of cheap silicon cells has been therefore prohibitive.

SUMMARY OF THE INVENTION

The invention broadly comprises a parallel paired closely coupled first and second harmonic resonant notch filter array to double the frequency of the transmitted radiation. Frequency doubling filters made as described herein are particularly useful in the field of thermophotovoltaics for upgrading black body radiation from heated objects to a shorter wavelength suitable for illuminating inexpensive readily available silicon solar cells. Such filters have additional broad application in the fields of optics and architectural illumination.

The present invention makes it possible to illuminate silicon cells from a 1400° K. source by frequency doubling the 2 microns radiation emitted near the peak of the radiation spectrum at 1400° K. to the 1 micron of wavelength optimal for silicon cells. Radiation which is not transmitted and frequency doubled in the process is reflected by the filter back to the heated object and conserved. In the process of frequency doubling, the quantum count intensity of the transmitted portion of the incident radiation is reduced by half at a minimum. Multiple frequency doubling filters used in series may be employed to upgrade thermal radiation from relatively low grade heat sources to wavelengths compatible with silicon photocells, and optical concentration used to compensate for the substantial loss of intensity through the multiple stages. Multiple stage doubling makes it possible to use readily available efficient silicon solar cells in virtually any TPV application down to the thermal level of waste heat recovery.

In addition, frequency doubling filters of the present invention may be employed to upgrade to the visible range thermal radiation from incandescent lamps for improved lighting efficiency, and for converting the output of common inexpensive light emitted diodes toward the blue end of the spectrum in LED based color displays.

DESCRIPTION OF THE PREFERRED EMBODIMENT(S)

The invention relates to known resonant array electromagnetic filter methods and further involves superposing two such resonant arrays closely coupled at one half wavelength spacing, with the second array dimensioned to resonate at twice the resonant frequency of the first. Resonance in the first array then excites resonance in the second, at the second harmonic of the first. The second array then radiates at the doubled frequency. The composite forms a frequency doubling bandpass filter. The theory of resonant array filters is known in the prior art.

Figure 1:
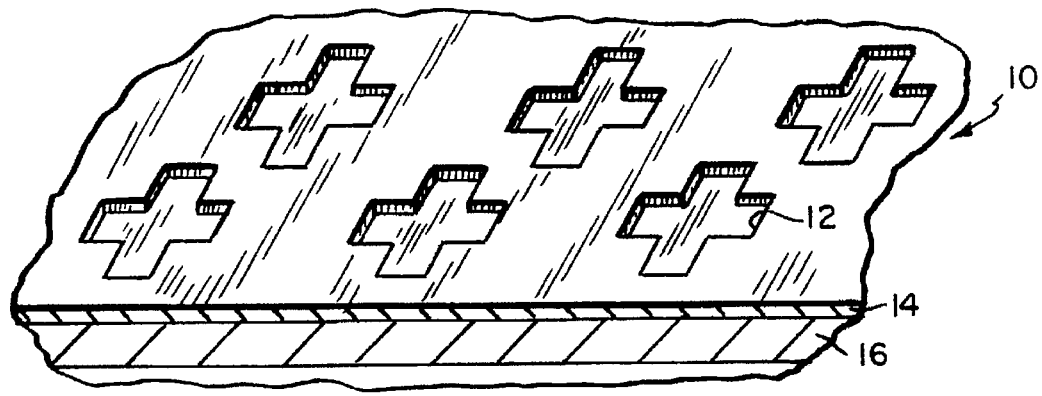
FIG. 1 is an illustration of a resonant array filter.

Referring to FIG. 1, a typical array is shown generally at 10 and consists of multiple cross-shaped apertures 12 formed in a conducting film 14 (typically gold for maximum off-passband reflectance) deposited on a dielectric substrate 16. The dimensions of the apertures and the dielectric constant of the substrate determine the passband of the filter. Typically, the height and width of the apertures corresponds to one half wavelength of the center of the passband radiation in the dielectric, while the aspect ratios of the lines comprising the apertures determine the width of the passband. In a resonant filter designed to pass 2 microns (in vacuum) radiation the apertures will measure 0.72 micron across their long dimensions assuming a quartz substrate with a refractive index around 1.4. The four individual lines comprising each aperture can be 0.1 micron wide. The conductive film can be from 0.05 to 0.1 micron thick. A second such array would have a resonant frequency twice that of the first if all the dimensions were halved.

Such filters are described as a multiplicity of LC tank circuits in which the conductive film is the inductor and the dielectric in the aperture is the capacitor. In common with all tank circuits, a resonance in one circuit can be inductively coupled to an adjacent circuit resonating at an integral multiple of the frequency of the first to form a frequency multiplier.

Figure 2:
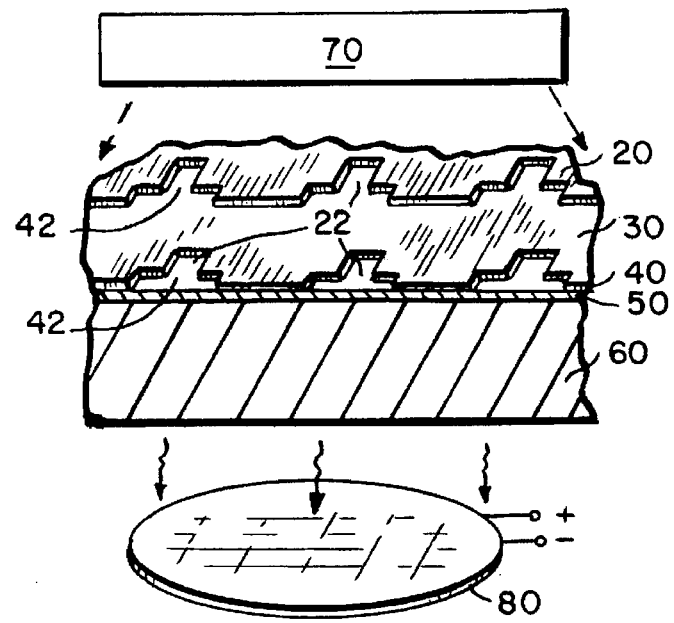
FIG. 2 is an illustration of a paired resonant notch filter array system embodying the invention.

Referring to FIG. 2, a four layer planar device is illustrated with a first conductive layer 20, a dielectric interlayer 30, a second conductive layer 40, a base dielectric layer 50, and a substrate 60. The filter receives radiation from a heated body 70. Apertures 22 in first conductive layer 20 are cut with the dimensions described above to form resonators centered on the 2 microns (in vacuum) radiation available from a 1400° K. thermal source. The thicknesses are as described above. The dielectric interlayer 30 is 0.72 micron thick (one half wavelength for 1.4 refractive index) so that the reflected wave from the second filter plane returns in phase with the resonance in the first filter plane. Apertures 42 in conductive layer 40 are cut with dimensions one half those of apertures 22 to resonate at a wavelength of 1.0 micron. The substrate underneath (typically glass with a layer of controlled dielectric constant material applied) may be as thick as needed to provide sufficient strength. Note that each aperture 22 is centered on a corresponding aperture 42 to form an inductive couple, and the number of apertures in both aperture layers is the same.

In operation, radiation from a heated body 70 induces resonance at 2 microns vacuum wavelength in apertures 22. Inductive coupling induces sympathetic resonance at twice the frequency in apertures 42. These then re-radiate at 1 micron vacuum wavelength through the substrate to illuminate a silicon photocell 80.

These structures may be formed by any of several means well established in the prior art of integrated circuit manufacture.

Figure 3:
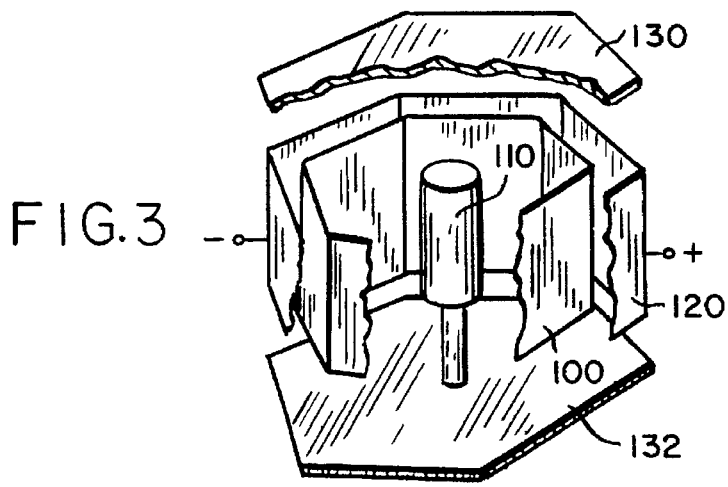
FIG. 3 illustrates a thermophotovoltaic generator embodying the invention.

FIG. 3 illustrates a complete TPV generator, in which a frequency doubling filter array 100 surrounds a heated object 110 (at 1400° K.) to illuminate silicon photocell array 120 with selective frequency doubled radiation. The filter array reflects the radiation it does not transmit back to the heated object to reduce the energy needed to keep the object hot. Reflective end caps 130 and 132 prevent radiation loss where it is impractical to position filters and photocells. To suppress convection, the filters and end caps can be hermetically sealed and the region around the heated object evacuated.

It will be apparent to those skilled in the art that the invention may be fabricated to double or multiply the frequency of electromagnetic radiation at any wavelength for which the necessary dimensions can be fabricated, large or small. The same concept may be employed to attain higher order frequency multiplication in a single stage, and in applications other than TPV.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A frequency doubling resonant array passband filter comprising:

two parallel superposed resonant aperture filter arrays spaced apart by one half wavelength of the designed input stage passband frequency, the output plane of resonant apertures being dimensioned to resonate at twice the frequency of the input plane of resonant apertures.

2. The filter of claim 1 wherein the output plane of resonant apertures are dimensioned to resonate at any integral multiple or sub-multiple of the resonant frequency of the input plane of apertures.

3. The filter of claim 1 wherein one or more additional layers or resonant apertures are incorporated to provide two or more frequency doubling or multiplying stages in a single monolithic device.

* * * * *